March 20, 1928.
H. ALBERTINE
1,662,842
LUBRICATING APPARATUS
Filed April 26, 1926
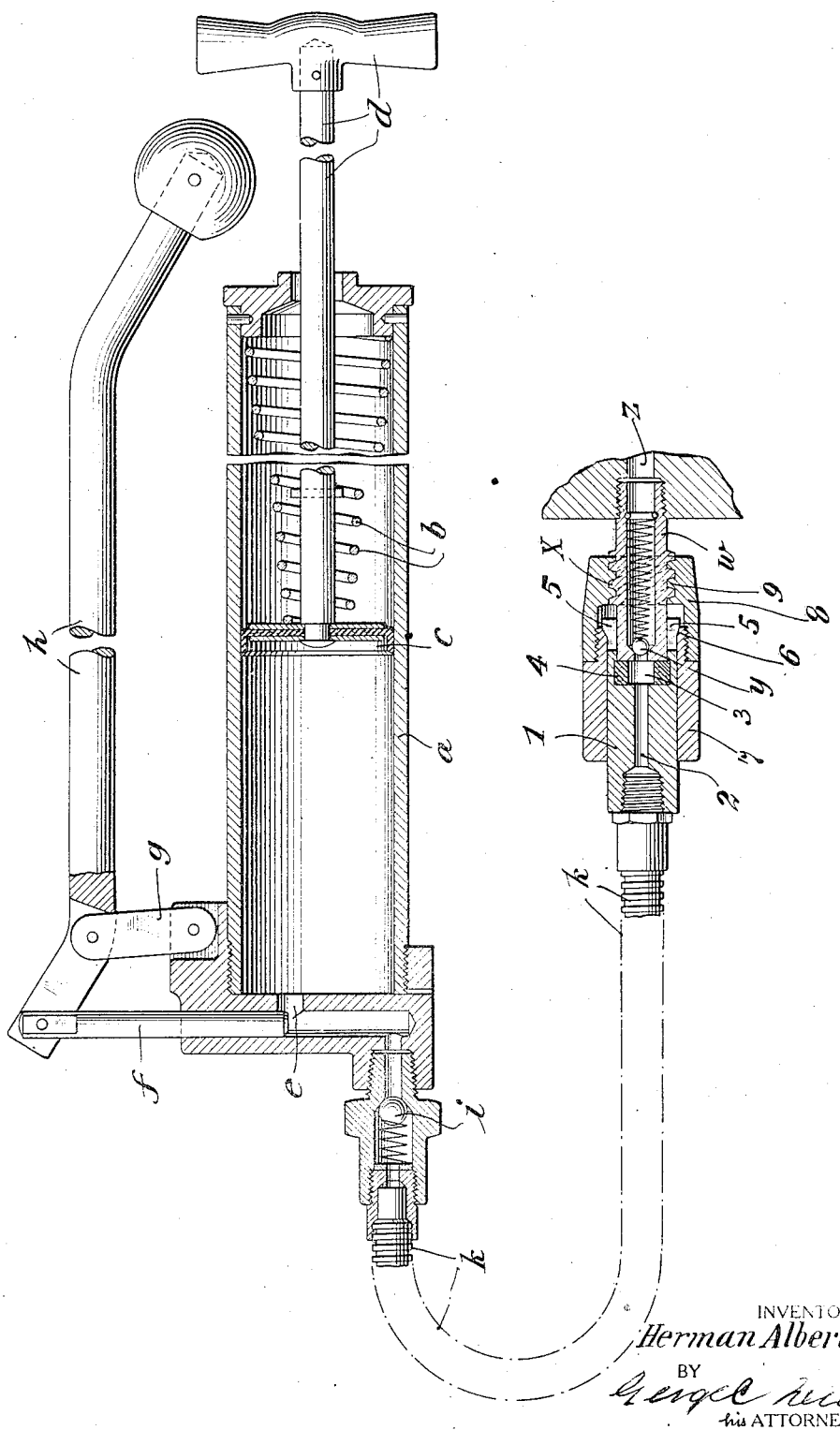
INVENTOR
*Herman Albertine*
BY
*George C. Shoaf*
his ATTORNEY Patented Mar. 20, 1928.

1,662,842

UNITED STATES PATENT OFFICE.

HERMAN ALBERTINE, OF EAST RUTHERFORD, NEW JERSEY, ASSIGNOR, BY MESNE ASSIGNMENTS, TO ROGERS PRODUCTS CO. INC., A CORPORATION OF NEW JERSEY.

LUBRICATING APPARATUS.

Application filed April 26, 1926. Serial No. 104,558.

My present invention is shown as embodied in a device primarily designed for use as a coupling in connection with a grease gun for forcing grease through the ducts of bearings on automobiles and other machinery, particularly in cases where the duct inlets are normally closed by nipples having ball inlet check valves, as in recently expired British patent to Alley and Woodvine, No. 21,893, of 1906, Oct. 4.

A nipple, exteriorly screw-threaded as in said British patent, happens to be selected as the type for which my coupling is specifically designed and proportioned, but there are various other forms of valve nipples for use with which the novel features of my device may be readily adjusted. In fact, my present coupling may in some respects be considered as an improvement or modification of the coupling shown in application Ser. No. 74,680, by Charles L. Zabriskie, and in which the screw cam principle is utilized as means for forcing the nozzle against the nipple.

My coupling includes a swivel member, adapted to be rotated or interlocked with the screw-thread or other engaging device on the exterior of the nipple to force the end of the nipple into contact with an ordinary packing ring or washer as in said Zabriskie application, but an important novel feature of my device is utilizing the swivel as means for operating radial clamping jaws somewhat similar to the jaws of a chuck, whereby after being engaged with the nipple, by the usual rotary movement, the coupling is prevented from reverse rotation. Such reverse rotation sometimes happens even where the coupling is rigidly mounted on the end of the grease gun, but it is much more likely to happen where a flexible metallic hose is used as means for supplying the coupling from a source capable of supplying the grease under very great pressure. By my present invention, the greater the pressure of the grease, the more tightly the chuck element of the device grips the exterior of the nipple, thus operating to lock the coupling against reverse rotation, more strongly, in proportion as the rotary or unscrewing effort increases.

The above and other features of my invention may be more fully understood from the following description in connection with the accompanying drawings, in which The figure shows my coupling in longitudinal section and associated with a nipple through which the lubricant is to be forced and a high pressure pump for supplying grease, said nipple and said pump being also in longitudinal section.

The specific source of supply of grease under high pressure is unimportant, but is conventionally indicated as including a reservoir cylinder, $a$, in which grease is pressed forward by spring $b$, acting through piston $c$, which latter may be retracted by handle $d$. The piston force feeds grease into the pump cylinder, $e$, whence it is expelled by single-acting pump plunger, $f$, pivoted on link, $g$, and operated by handle $h$. As shown, the exit of the pump is controlled by ball check valve, $i$, adapted to hold pressure in the flexible hose, $k$, during retracting strokes of the pump plunger.

The nipple in connection with which the coupling is to be used is conventionally indicated as comprising a tube, $w$, having an exterior screw-thread, $x$, of high pitch, preferably a double thread, and provided with an inlet ball check valve, $y$, permitting grease flow to, but preventing reverse flow from, the duct, $z$, through which the grease is to be forced to the bearing not shown.

The coupling includes a suitable nozzle, 1, screw-coupled to the flexible metallic hose, $k$, and having a passage 2 leading to an enlargement, 3, in which is seated an ordinary leather washer, 4, which engages the end of the nipple, $w$.

Beyond the washer, the end is split longitudinally to form integral spring jaws, 5, 5, which are exteriorly enlarged toward the ends to afford a rearwardly presented cone annulus, 6, for swivel engagement by a surrounding correspondingly coned annulus on swivel sleeve 7. This sleeve has an extension sleeve member, 8, the forward end of which is formed with the internal screw-thread 9, or equivalent means for detachably securing the sleeve to the exterior of the nipple.

In operation, the coupling is slipped over the nipple endwise and the swivel sleeve rotated to screw internal thread 9 on external thread $x$, without appreciable resistance until the end of nipple $w$ contacts the elastic packing 4. Thereafter, further screwing compresses said packing and its increasing resistance to compression, as the screwing progresses, causes correspondingly increasing endwise pressure and wedging effect on the cone annulus 6 of spring jaws, by the cone annulus of the swivel sleeve member 7. The spring jaws 5 are thus forced inward and clutch the exterior of the nipple $w$, while the packing is forced against the end thereof. While the practical limit of this operation may be fixed by approximately equal final resistances to compression of the packing and of the spring dogs, it is evident that one of these resistances may be much greater than the other and in practice it will be found that, with the leather packing washer as shown, any pressure that will lock the dogs, will be also more than sufficient to prevent leaks of grease between the packing and the end of the nipple when the grease pressure is applied.

In this connection, it is to be noticed as an important feature of my invention, that as the grease pressure increases, the wedging and locking effect on the spring dogs increases in rapid ratio, the effect of such pressure being exerted backward on the dogs, thus wedging them more tightly into cone of sleeve 7 which is pressed in the opposite direction by the same pressure and which in any event is anchored against longitudinal movement by nipple thread, $w$.

From the above, it will be evident that any unscrewing due to great pressure within the spirally constructed flexible holder, $k$, cannot operate to unscrew the coupling from the nipple. Furthermore, stripping of the threads or pins or other detachable coupling means on the exterior of the nipple, which not infrequently occurs where great pressure is applied to force grease through obstructed ducts, is rendered unlikely, if not impossible, because endwise pull such as could cause said stripping has a multiple effect in increasing the tightness of the clamping of the jaws against the sides of the nipple, thus greatly increasing the resistance to endwise blowing off of the coupling from the nipple.

The extension, 8, is shown as secured to the sleeve, 7, by a screw thread and, by relatively rotating these parts, this thread may be utilized as a means for pulling the coupling forward for the above described endwise engagement of the nipple, $w$, with the washer 4 and cam closing of the spring jaws 5, upon the exterior of the nipple. This may be desirable where the detachable engagement of the coupling with the nipple is by a simple bayonet joint arrangement that lacks cam or screw tightening effect, when the parts are rotated. In the form shown, however, the screw thread, $x$, affords all the endwise forcing movement that is required and the screw-joint between sleeve 7 and extension 8 is utilized merely as a mechanical expedient of assembling the sleeve members in swivel relation to the enlarged heads of the spring jaws, 5.

It will be understood that the means I have shown for force feeding the grease is merely illustrative of the high pressure source and, while the pump shown can be made in proportions capable of delivering the grease at many thousand pounds pressure, there are now available, for use with my coupling, various pressure feed mechanisms better adapted for delivering the grease in quantities at pressures up to 15,000 pounds or 20,000 pounds per square inch, or even higher.

I claim:

1. A high pressure coupling for nipples of lubricating ducts, including a nozzle member formed for engagement with the end of the nipple and associated with radially movable chuck jaws for engaging the sides of the nipple, in combination with a sleeve having swivel coupling with said nozzle and extending beyond said jaws and there provided with means for detachably locking the sleeve and nipple to hold the nozzle in engagement therewith and means whereby longitudinal withdrawal stress on the swivel coupling forces said chuck jaws into gripping engagement with the sides of said nipple.

2. A high pressure coupling for nipples of lubricating ducts, including a nozzle member formed for engagement with the end of the nipple and associated with radially movable chuck jaws for engaging the sides of the nipple, in combination with a sleeve swiveled upon said nozzle and extending beyond said jaws and there provided with means for screwing engagement with the nipple to force endwise engagement thereof with said nozzle and means whereby longitudinal stress between the sleeve and the nozzle forces said chuck jaws into gripping engagement with the sides of said nipple.

3. A high pressure coupling for nipples of lubricating ducts, including a nozzle member having an elastic packing arranged for face engagement with the end of the nipple and associated with radially movable chuck jaws for engaging the sides of the nipple, in combination with a sleeve swiveled upon said nozzle and extending beyond said jaws and there provided with means for detachably coupling the sleeve over the nipple to hold the packing in engagement therewith and radially acting cam surfaces whereby longitudinal tension between the sleeve and the nozzle forces said chuck jaws into gripping engagement with the sides of said nipple.

4. A high pressure coupling for nipples of lubricating ducts, including a tubular nozzle member having a grease passage terminating in a radial wall forming the bottom of a cylindrical recess, an elastic packing washer on the bottom of said recess for end engagement with the nipple and having a central perforation substantially larger than the grease passage leading thereto, said nozzle being provided beyond the packing with radially movable dogs for engaging the sides of the nipple, said dogs having outwardly enlarged heads arranged in an annulus and formed with longitudinally inclined rear surfaces, in combination with a sleeve swiveled upon said annulus and formed with internally coned surfaces engaging said inclined rear faces and having a forwardly extending portion adapted for quick detachable engagement with corresponding members on the sides of the nipple.

5. A high pressure coupling for nipples of lubricating ducts, including a nozzle member formed with a longitudinal bore terminating in a cylindrical cavity having an annular bottom wall faced with an annular elastic packing adapted to fit against the end of the nipple, the walls of the cavity being split to form a plurality of radially movable spring chuck members with jaw surfaces for engaging the sides of the nipple and also with external rearwardly presented cam surfaces, in combination with a sleeve swiveled upon said nozzle and formed with internally coned forwardly presented wedging surfaces engaging said rearwardly presented cam surfaces on the chuck members.

6. A high pressure coupling for nipples of lubricating ducts, including a nozzle member formed with a longitudinal bore terminating in a cylindrical cavity having an annular bottom wall faced with an annular elastic packing adapted to fit against the end of the nipple, the walls of the cavity being split to form radially movable chuck members with jaw surfaces for engaging the sides of the nipple and also with external rearwardly presented cam surfaces, in combination with a sleeve swiveled upon said nozzle and formed with internally coned forwardly presented wedging surfaces engaging said rearwardly presented cam surfaces on the chuck members, said sleeve having also a portion extending beyond said chuck members and formed for detachable engagement with corresponding engageable members on the sides of the nipple.

7. A high pressure coupling for nipples of lubricating ducts, including a nozzle member formed with a longitudinal bore terminating in a cylindrical cavity having an annular bottom wall faced with an annular elastic packing adapted to fit against the end of the nipple, the walls of the cavity being split to form radially movable chuck members with jaw surfaces for engaging the sides of the nipple and also with external rearwardly presented cam surfaces, in combination with a sleeve swiveled upon said nozzle and formed with internally coned forwardly presented wedging surfaces engaging said rearwardly presented cam surfaces on the chuck members, said sleeve being also provided with means for detachably securing the sleeve over the nipple at a point remote from the end thereof.

8. A high pressure coupling for nipples of lubricating ducts, including a nozzle member formed to receive and fit against the end of the nipple and having radially movable chuck members with jaw surfaces for engaging the sides of the nipple and also with radially wedging cam surfaces, in combination with a sleeve swiveled upon said nozzle and formed with internally coned forwardly presented wedging surfaces engaging said radially wedging cam surfaces on the chuck members.

9. A high pressure coupling for nipples of lubricating ducts, including a nozzle member formed to receive and fit against the end of the nipple and having radially movable chuck members with jaw surfaces for engaging the sides of the nipple and also with radially wedging cam surfaces, in combination with a sleeve swiveled upon said nozzle and formed with internally coned forwardly presented wedging surfaces engaging said radially wedging cam surfaces on the chuck members, said sleeve also having a portion extending beyond said chuck members and formed for detachable engagement with corresponding engageable members on the sides of the nipple.

10. A high pressure coupling for nipples of lubricating ducts, including a nozzle member formed to receive and fit against the end of the nipple and having radially movable chuck members with jaw surfaces for engaging the sides of the nipple and also with radially wedging cam surfaces, in combination with a sleeve swiveled upon said nozzle and formed with internally coned forwardly presented wedging surfaces engaging said radially wedging cam surfaces on the chuck members, said sleeve also being provided with means for detachably securing the sleeve over the nipple at a point remote from the end thereof.

Signed at New York city in the county of New York, and State of New York this 22 day of April, A. D. 1926.

HERMAN ALBERTINE.